(12) United States Patent
Tsubota

(10) Patent No.: US 12,496,042 B2
(45) Date of Patent: Dec. 16, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Keiji Tsubota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 18/586,388

(22) Filed: Feb. 23, 2024

(65) Prior Publication Data

US 2024/0315668 A1 Sep. 26, 2024

(30) Foreign Application Priority Data

Mar. 20, 2023 (JP) .................................. 2023-043791

(51) Int. Cl.
*A61B 8/00* (2006.01)
*G08B 21/18* (2006.01)

(52) U.S. Cl.
CPC ............ *A61B 8/4472* (2013.01); *A61B 8/469* (2013.01); *A61B 8/54* (2013.01); *G08B 21/182* (2013.01); *A61B 8/4488* (2013.01)

(58) Field of Classification Search
CPC ......... A61B 8/4472; A61B 8/469; A61B 8/54; A61B 8/4488; A61B 8/565; A61B 8/4427; G08B 21/182; H04W 4/80
See application file for complete search history.

(56) References Cited

U.S. PATENT DOCUMENTS

| 2010/0191121 A1* | 7/2010 | Satoh ................. A61B 8/4472 600/459 |
| 2014/0180110 A1* | 6/2014 | Schmedling ......... A61B 8/4472 600/447 |
| 2018/0263600 A1* | 9/2018 | Bell .................... A61B 8/4472 |
| 2019/0059855 A1* | 2/2019 | Jin ....................... A61B 8/565 |

FOREIGN PATENT DOCUMENTS

| EP | 4176820 A1 * | 5/2023 | ............ A61B 8/467 |
| JP | 2018-527054 A | 9/2018 | |

* cited by examiner

*Primary Examiner* — Anne M Kozak
*Assistant Examiner* — Kaitlyn E Sebastian
(74) *Attorney, Agent, or Firm* — Studebaker Brackett PLLC

(57) ABSTRACT

Provided are a control method of an ultrasound diagnostic apparatus and an ultrasound diagnostic apparatus that enable a user to smoothly start an examination even in a case where there are a plurality of ultrasound probes or a plurality of apparatus bodies.
There is provided an ultrasound diagnostic apparatus including: an ultrasound probe; and an apparatus body wirelessly connected to the ultrasound probe, in which the ultrasound probe performs wireless communication with the apparatus body, the ultrasound probe and the apparatus body have notification units, and in a case where a first device consisting of one of the ultrasound probe and the apparatus body is in a sleep state, wireless communication is performed from a second device consisting of the other to the first device in response to a predetermined operation performed by a user with respect to the second device so that the first device is switched from the sleep state to an activation state, and the notification unit of the first device issues a notification that the first device is activated by the second device.

19 Claims, 6 Drawing Sheets

ULTRASOUND DIAGNOSTIC APPARATUS AND CONTROL METHOD OF ULTRASOUND DIAGNOSTIC APPARATUS

CROSS-REFERENCE TO RELATED APPLICATIONS

The present application claims priority under 35 U.S.C. § 119 to Japanese Patent Application No. 2023-043791, filed on Mar. 20, 2023. The above application is hereby expressly incorporated by reference, in its entirety, into the present application.

BACKGROUND OF THE INVENTION

1. Field of the Invention

The present invention relates to an ultrasound diagnostic apparatus and a control method of an ultrasound diagnostic apparatus for performing wireless communication between an ultrasound probe and an apparatus body.

2. Description of the Related Art

Conventionally, examinations of subjects have been performed by capturing ultrasound images inside the subject using a so-called ultrasound diagnostic apparatus. Such an ultrasound diagnostic apparatus typically tends to have an ultrasound probe that performs scanning with ultrasound waves on a subject, and an apparatus body that performs display or the like of an ultrasound image obtained by scanning with the ultrasound probe.

For example, JP2018-527054A discloses an ultrasound diagnostic apparatus comprising an ultrasound probe and an apparatus body that perform so-called wireless communication with each other. JP2018-527054A discloses a technique for putting the ultrasound probe located within a predetermined distance from the apparatus body into a wirelessly connectable state to the apparatus body, that is, for performing so-called pairing-setting.

SUMMARY OF THE INVENTION

Meanwhile, for example, in facilities such as a hospital, a care facility, or a visiting nursing center, there may be a plurality of ultrasound probes and a plurality of apparatus bodies that can perform wireless communication with each other, and the plurality of ultrasound probes and the plurality of apparatus bodies may be shared among a plurality of users. In this case, the user may have difficulty in understanding a combination of an ultrasound probe and an apparatus body that are pairing-set with each other or are wirelessly connected to each other, among the plurality of ultrasound probes and the plurality of apparatus bodies, which may hinder the smooth start of the examination.

The present invention has been made to solve such a conventional problem, and an object of the present invention is to provide an ultrasound diagnostic apparatus and a control method of an ultrasound diagnostic apparatus that enable a user to smoothly start an examination even in a case where there are a plurality of ultrasound probes and a plurality of apparatus bodies.

According to the following configuration, the above-described object can be achieved.

[1] An ultrasound diagnostic apparatus comprising:
an ultrasound probe; and
an apparatus body wirelessly connected to the ultrasound probe,
in which the ultrasound probe performs wireless communication with the apparatus body,
the apparatus body performs wireless communication with the ultrasound probe,
each of the ultrasound probe and the apparatus body has a notification unit, and
in a case where a first device at least consisting of one of the ultrasound probe and the apparatus body is in a sleep state, wireless communication is performed from a second device consisting of the other of the ultrasound probe and the apparatus body to the first device in response to a predetermined operation performed by a user with respect to the second device so that the first device is switched from the sleep state to an activation state, and the notification unit of the first device issues a notification that the first device is activated by the second device.

[2] The ultrasound diagnostic apparatus according to [1], in which the first device and the second device are in a mutually pairing-set state or in a mutually pairing-settable state.

[3] The ultrasound diagnostic apparatus according to [1] or [2],
in which a plurality of the first devices that are pairing-set or pairing-settable with respect to the second device are provided,
the second device has a selection unit for the user to select one of the plurality of first devices, and
the first device selected by the selection unit is switched from the sleep state to the activation state.

[4] The ultrasound diagnostic apparatus according to any one of [1] to [3],
in which the second device has a distance measurement unit that measures a distance to the first device, and
the notification unit of the second device issues a notification of the distance to the first device measured by the distance measurement unit.

[5] The ultrasound diagnostic apparatus according to [4], in which the notification unit issues a warning in a case where the distance to the first device measured by the distance measurement unit exceeds a predetermined distance threshold value.

[6] The ultrasound diagnostic apparatus according to [5], in which the notification unit issues a warning in a case where the second device is unable to recognize the first device.

[7] The ultrasound diagnostic apparatus according to [4],
in which the distance measurement unit measures an azimuth with respect to the first device together with the distance to the first device,
the second device has a memory that stores floor plan information of a facility equipped with the first device and the second device, and a position identification unit that identifies a position of the first device in the floor plan information based on the distance and the azimuth with respect to the first device measured by the distance measurement unit, and
the notification unit issues a notification of the position of the first device in the floor plan information identified by the position identification unit.

[8] The ultrasound diagnostic apparatus according to [7],
in which a plurality of the first devices that are pairing-set or pairing-settable with respect to the second device are provided,
the second device has a selection unit for the user to select one of the plurality of first devices,
the position identification unit identifies a position of the first device in the floor plan information, which is not selected by the selection unit among the plurality of first devices, and
the notification unit issues a notification of the position of the non-selected first device in the floor plan information identified by the position identification unit.
[9] The ultrasound diagnostic apparatus according to any one of [1] to [8],
in which the second device has an activation switch, and
the predetermined operation is a turn-on operation of the activation switch.
[10] The ultrasound diagnostic apparatus according to any one of [1] to [8],
in which the second device has a voice recognition unit, and
the predetermined operation is an operation using a voice.
[11] The ultrasound diagnostic apparatus according to any one of [1] to [8],
in which the second device has a vibration sensor, and
the predetermined operation is a predetermined gesture operation for vibrating the second device.
[12] The ultrasound diagnostic apparatus according to any one of [1] to [8],
in which the second device has a touch panel, and
the predetermined operation is a predetermined input operation performed via the touch panel.
[13] The ultrasound diagnostic apparatus according to [3],
in which the selection unit consists of a toggle type switch or a plurality of separate type switches.
[14] The ultrasound diagnostic apparatus according to [3],
in which the second device has a voice recognition unit, and
the selection unit selects the first device based on voice recognition by the voice recognition unit.
[15] The ultrasound diagnostic apparatus according to [3],
in which the second device has a monitor, and
the selection unit performs selection from the plurality of first devices displayed on the monitor.
[16] The ultrasound diagnostic apparatus according to [3],
in which the second device has a vibration sensor, and
the selection unit selects the first device based on a predetermined gesture operation for vibrating the second device.
[17] The ultrasound diagnostic apparatus according to [3],
in which the second device has a touch panel, and
the selection unit selects the first device based on an input operation of a predetermined figure performed via the touch panel.
[18] A control method of an ultrasound diagnostic apparatus, comprising:
performing, through a user, in a case where a first device at least consisting of one of an ultrasound probe and an apparatus body is in a sleep state, a predetermined operation with respect to a second device consisting of the other of the ultrasound probe and the apparatus body;
switching the first device from the sleep state to an activation state by performing wireless communication from the second device to the first device; and
issuing, through a notification unit of the first device, a notification that the first device is activated by the second device.

According to the present invention, there is provided an ultrasound diagnostic apparatus comprising: an ultrasound probe; and an apparatus body wirelessly connected to the ultrasound probe, in which the ultrasound probe performs wireless communication with the apparatus body, the apparatus body performs wireless communication with the ultrasound probe, each of the ultrasound probe and the apparatus body has a notification unit, and in a case where a first device at least consisting of one of the ultrasound probe and the apparatus body is in a sleep state, wireless communication is performed from a second device consisting of the other of the ultrasound probe and the apparatus body to the first device in response to a predetermined operation performed by a user with respect to the second device so that the first device is switched from the sleep state to an activation state, and the notification unit of the first device issues a notification that the first device is activated by the second device. Therefore, the user can smoothly start the examination even in a case where there are a plurality of ultrasound probes and a plurality of apparatus bodies.

DESCRIPTION OF THE PREFERRED EMBODIMENTS

Hereinafter, embodiments of the present invention will be described with reference to the accompanying drawings.

Although the description of configuration requirements to be described below is made based on a representative embodiment of the present invention, the present invention is not limited to such an embodiment.

In the present specification, a numerical range represented by "to" means a range including numerical values described before and after "to" as a lower limit value and an upper limit value.

In the present specification, "same" and "identical" include error ranges generally allowed in the technical field.

Embodiment 1

Figure 1:
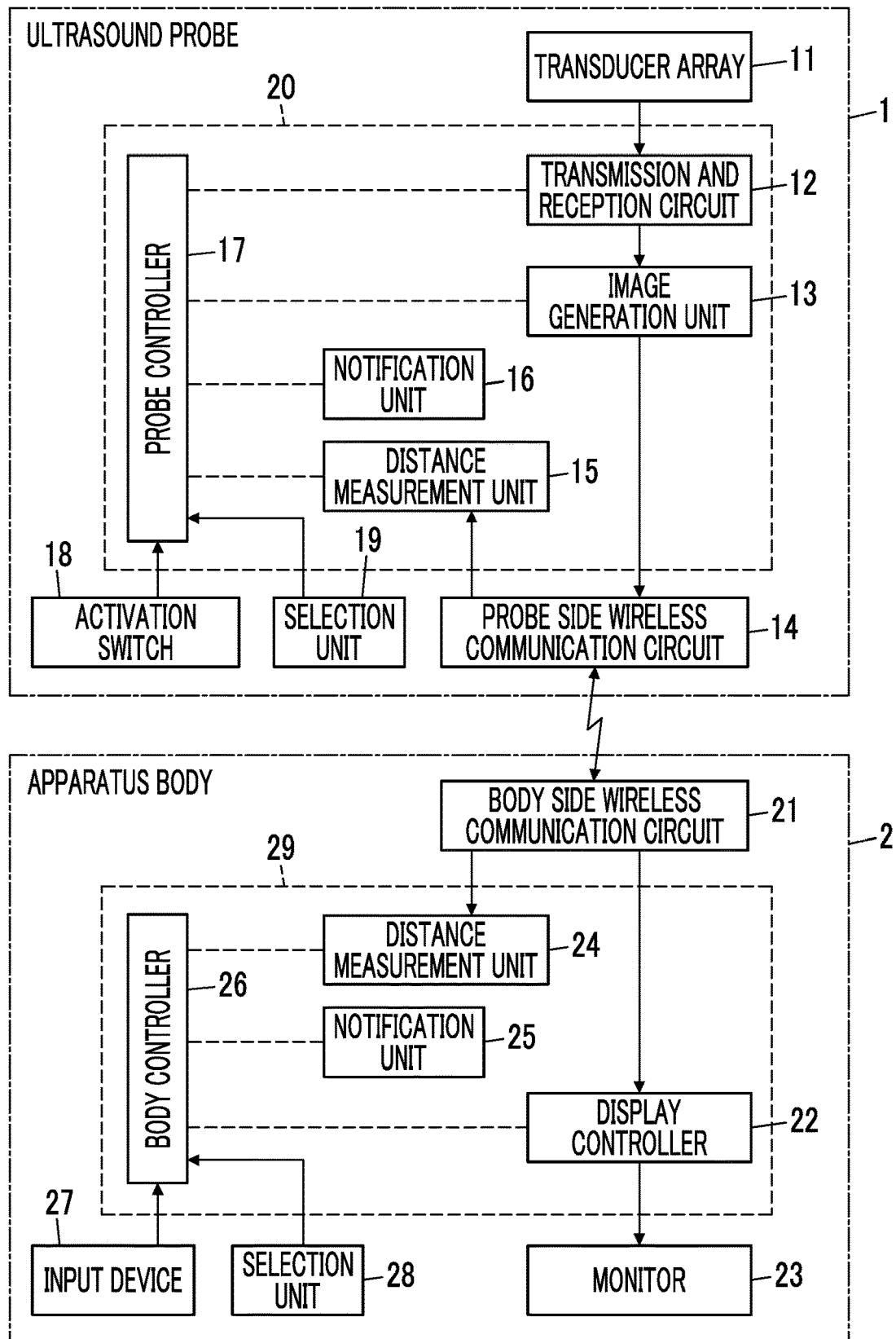
FIG. 1 is a block diagram showing a configuration of an ultrasound diagnostic apparatus according to Embodiment 1 of the present invention.

FIG. 1 shows a configuration of an ultrasound diagnostic apparatus according to an embodiment of the present invention. The ultrasound diagnostic apparatus comprises an ultrasound probe 1 and an apparatus body 2 that performs so-called wireless communication with the ultrasound probe 1.

In the ultrasound diagnostic apparatus of the embodiment of the present invention, as will be described below, the ultrasound probe 1 and the apparatus body 2 are in a so-called mutually pairing-set state or in a mutually pairing-settable state, and in a case where one device of the ultrasound probe 1 and the apparatus body 2 is in a so-called sleep state, the user operates the other device to put the one device into an activation state.

Here, the ultrasound probe 1 and the apparatus body 2 being in the mutually pairing-settable state refers to a state in which at least the other device, which transmits an activation command among the ultrasound probe 1 and the apparatus body 2, recognizes the presence of the one device, and the other device can request pairing-setting from the one device. Further, the sleep state in the ultrasound probe 1 and the apparatus body 2 refers to a state in which power supply to a unit other than a memory (not shown) is stopped in the ultrasound probe 1 and the apparatus body 2, for example, as defined by standards such as advanced configuration and power interface (ACPI).

The ultrasound probe 1 has a transducer array 11. A transmission and reception circuit 12, an image generation unit 13, and a probe side wireless communication circuit 14 are sequentially connected to the transducer array 11. A distance measurement unit 15 is connected to the probe side wireless communication circuit 14. In addition, the ultrasound probe 1 comprises a notification unit 16. Further, a probe controller 17 is connected to the transmission and reception circuit 12, the image generation unit 13, the distance measurement unit 15, and the notification unit 16. An activation switch 18 and a selection unit 19 are connected to the probe controller 17. Further, the transmission and reception circuit 12, the image generation unit 13, the distance measurement unit 15, the notification unit 16, and the probe controller 17 constitute a processor 20 for the ultrasound probe 1.

The apparatus body 2 comprises a body side wireless communication circuit 21. A display controller 22 and a monitor 23 are sequentially connected to the body side wireless communication circuit 21. A distance measurement unit 24 is connected to the body side wireless communication circuit 21. In addition, the apparatus body 2 comprises a notification unit 25. Further, a body controller 26 is connected to the display controller 22, the distance measurement unit 24, and the notification unit 25. An input device 27 and a selection unit 28 are connected to the body controller 26. Moreover, the display controller 22, the distance measurement unit 24, the notification unit 25, and the body controller 26 constitute a processor 29 for the apparatus body 2.

The transducer array 11 of the ultrasound probe 1 has a plurality of ultrasound transducers that are one-dimensionally or two-dimensionally arranged. These ultrasound transducers each transmit an ultrasound wave in accordance with a drive signal supplied from the transmission and reception circuit 12 and receive an ultrasound echo from a subject to output a signal based on the ultrasound echo. For example, each ultrasound transducer includes a piezoelectric body and electrodes formed at both ends of the piezoelectric body. The piezoelectric body consists of a piezoelectric ceramic represented by lead zirconate titanate (PZT), a polymer piezoelectric element represented by poly vinylidene di fluoride (PVDF), a piezoelectric single crystal represented by lead magnesium niobate-lead titanate (PMN-PT), or the like.

Figure 2:
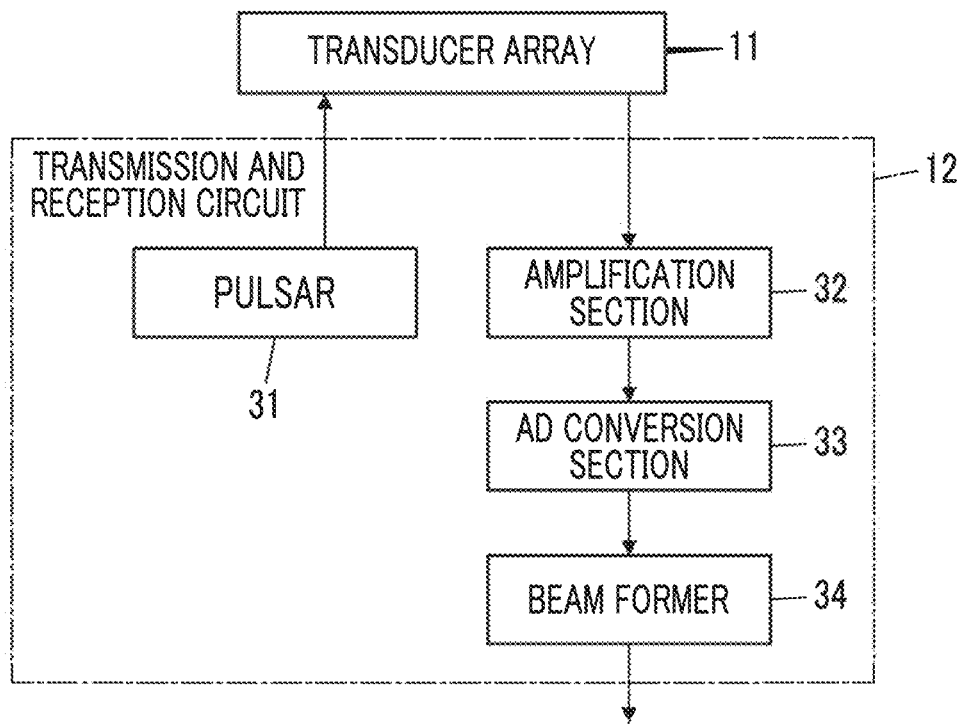
FIG. 2 is a block diagram showing a configuration of a transmission and reception circuit in Embodiment 1 of the present invention.

The transmission and reception circuit 12 transmits the ultrasound wave from the transducer array 11 and generates a sound ray signal based on a reception signal acquired by the transducer array 11, under the control of the probe controller 17. As shown in FIG. 2, the transmission and reception circuit 12 has a pulsar 31 connected to the transducer array 11, and an amplification section 32, an analog-to-digital (AD) conversion section 33, and a beam former 34 that are sequentially connected in series to the transducer array 11.

The pulsar 31 includes, for example, a plurality of pulse generators, and adjusts an amount of delay of each of drive signals and supplies the drive signals to the plurality of ultrasound transducers such that ultrasound waves transmitted from the plurality of ultrasound transducers of the transducer array 11 from an ultrasound beam based on a transmission delay pattern selected according to a control signal from the probe controller 17. In this way, in a case where a pulsed or continuous wave-like voltage is applied to the electrodes of the ultrasound transducer of the transducer array 11, the piezoelectric body expands and contracts to generate a pulsed or continuous wave-like ultrasound wave from each of the ultrasound transducers, thereby forming an ultrasound beam from the combined wave of these ultrasound waves.

The transmitted ultrasound beam is reflected in, for example, a target such as a site of the subject and propagates toward the transducer array 11 of the ultrasound probe 1. The ultrasound echo propagating toward the transducer array 11 in this way is received by each of the ultrasound transducers constituting the transducer array 11. In this case, each of the ultrasound transducers constituting the transducer array 11 receives the propagating ultrasound echo to expand and contract to generate a reception signal, which is an electrical signal, and outputs these reception signals to the amplification section 32.

The amplification section 32 amplifies the signal input from each of the ultrasound transducers constituting the transducer array 11 and transmits the amplified signal to the AD conversion section 33. The AD conversion section 33 converts the signal transmitted from the amplification section 32 into digital reception data. The beam former 34 performs so-called reception focus processing by applying and adding a delay to each reception data received from the AD conversion section 33. Through the reception focus processing, the sound ray signal in which each reception data converted by the AD conversion section 33 is phase-summed and a focus of the ultrasound echo is narrowed down is acquired.

Figure 3:
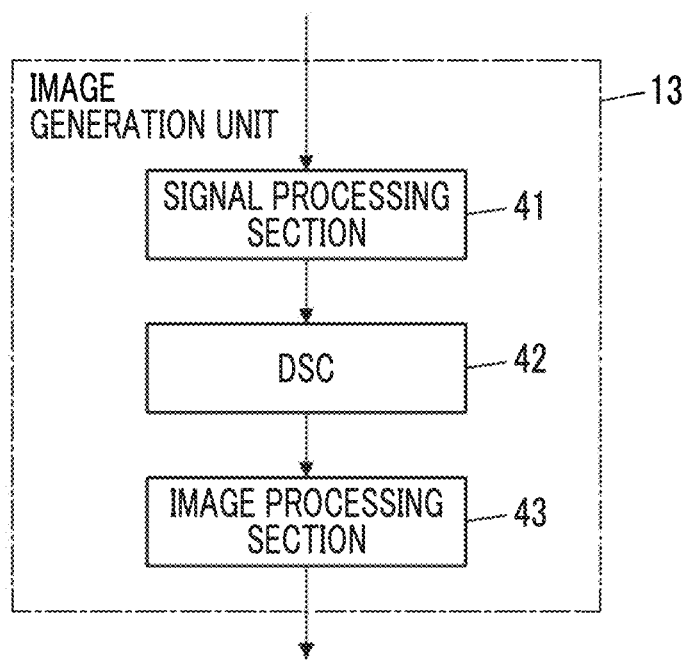
FIG. 3 is a block diagram showing a configuration of an image generation unit in Embodiment 1 of the present invention.

As shown in FIG. 3, the image generation unit 13 has a configuration in which a signal processing section 41, a digital scan converter (DSC) 42, and an image processing section 43 are sequentially connected in series.

The signal processing section 41 generates a B-mode image signal, which is tomographic image information regarding tissues inside the subject, by performing, on the sound ray signal received from the transmission and reception circuit 12, correction of the attenuation due to the distance according to the depth of the reflection position of the ultrasound wave using a sound velocity value set by the probe controller 17 and then performing envelope detection processing.

The DSC 42 converts (raster-converts) the B-mode image signal generated by the signal processing section 41 into an image signal in accordance with a normal television signal scanning method.

The image processing section 43 performs various types of necessary image processing such as gradation processing on the B-mode image signal input from the DSC 42 and then sends out the B-mode image signal to the probe side wireless communication circuit 14. Hereinafter, the B-mode image signal that has been subjected to image processing by the image processing section 43 is referred to as an ultrasound image.

The probe side wireless communication circuit 14 includes a circuit and the like including an antenna for transmitting and receiving radio waves and performs wireless communication with the body side wireless communication circuit 21 of the apparatus body 2. In this case, the probe side wireless communication circuit 14 modulates a carrier based on data such as the ultrasound image generated by the image generation unit 13 to generate a transmission signal and transmits the generated transmission signal to the body side wireless communication circuit 21. In addition, the probe side wireless communication circuit 14 demodulates the transmission signal transmitted from the body side wireless communication circuit 21. As the modulation method of the carrier, for example, amplitude shift keying (ASK), phase shift keying (PSK), quadrature phase shift keying (QPSK), 16 quadrature amplitude modulation (16QAM), or the like is used.

Wireless communication between the ultrasound probe 1 and the apparatus body 2, which is performed via the probe side wireless communication circuit 14 and the body side wireless communication circuit 21, allows the ultrasound probe 1 and the apparatus body 2 to authenticate each other and establish a wirelessly connectable state, that is, a so-called pairing-setting is mutually possible. Additionally, as will be described below, a turn-on operation of the activation switch 18 of the ultrasound probe 1 performed by the user allows the ultrasound probe 1 and the apparatus body 2, which are mutually pairing-set, to establish a wirelessly connected state, which is a state in which the ultrasound probe 1 and the apparatus body 2 can operate in cooperation with each other to perform the examination of the subject.

The probe controller 17 controls each unit of the ultrasound probe 1 based on a program or the like stored in advance.

The activation switch 18 is a switch for activating the apparatus body 2 from a sleep state. The activation switch 18 can also be configured, for example, with a mechanical switch or with a so-called touch panel.

In a case where the ultrasound probe 1 and the apparatus body 2 are in a mutually pairing-set state or in a mutually pairing-settable state, and the apparatus body 2 is in a sleep state, wireless communication for activating the apparatus body 2, that is, wireless transmission of an activation signal, is performed from the ultrasound probe 1 to the apparatus body 2 under the control of the probe controller 17 in response to the turn-on operation of the activation switch 18 performed by the user, the apparatus body 2 is switched from the sleep state to the activation state, and the ultrasound probe 1 and the apparatus body 2 are wirelessly connected to each other.

Here, in a case where the ultrasound probe 1 and the apparatus body 2 are in a mutually pairing-settable state, and the ultrasound probe 1 that transmits the activation command recognizes the presence of the apparatus body 2, the ultrasound probe 1 transmits, for example, a signal for requesting a response toward the apparatus body 2 from the probe side wireless communication circuit 14 through the probe controller 17 and can recognize the apparatus body 2 in a case where the response from the apparatus body 2 is obtained.

As will be described below, in a case where the ultrasound probe 1 and the apparatus body 2 are in a mutually pairing-set state or in a mutually pairing-settable state, and the ultrasound probe 1 is in a sleep state, by wirelessly transmitting a signal for activating the ultrasound probe 1, that is, an activation signal, from the apparatus body 2 to the ultrasound probe 1, the ultrasound probe 1 can be put into an activation state, and the ultrasound probe 1 and the apparatus body 2 can be wirelessly connected to each other.

The distance measurement unit 15 measures a distance between the ultrasound probe 1 and the apparatus body 2. In addition, the distance measurement unit 15 can also measure an azimuth with respect to the apparatus body 2 using the ultrasound probe 1 as a reference. The distance measurement unit 15 can measure the distance and the azimuth by using, for example, existing technologies such as Wi-Fi (registered trademark), global positioning system (GPS), Bluetooth low energy (BLE), or ultra wide band (UWB).

The notification unit 16 issues a notification of the activation of the ultrasound probe 1 by the activation signal from the apparatus body 2 and the distance between the ultrasound probe 1 and the apparatus body 2 measured by the distance measurement unit 15. In addition, the notification unit 16 can also issue a notification of the azimuth with respect to the apparatus body 2 measured by the distance measurement unit 15 together with the distance between the ultrasound probe 1 and the apparatus body 2.

For example, in a case where the ultrasound probe 1 has a monitor (not shown), the notification unit 16 can issue a notification by displaying a message on the monitor. In addition, for example, in a case where the ultrasound probe 1 has a speaker (not shown), the notification unit 16 can issue a notification through sound emitted via the speaker.

For example, in a case where the ultrasound probe 1 has a lamp (not shown), the notification unit 16 can turn on the lamp of the ultrasound probe 1 to issue a notification that the ultrasound probe 1 is activated by the activation signal from the apparatus body 2. In this case, the notification unit 16 can blink the lamp in a predetermined blinking pattern, for example.

For example, in a case where the ultrasound probe 1 has a vibration generation device (not shown) that vibrates the ultrasound probe 1, the notification unit 16 can vibrate the ultrasound probe 1 through the vibration generation device to issue a notification that the ultrasound probe 1 is activated by the activation signal from the apparatus body 2. In this case, the notification unit 16 can vibrate the ultrasound probe 1 in a predetermined vibration pattern, for example. The vibration generation device can be configured with a device that vibrates the ultrasound probe 1, such as a motor.

In a case where the notification unit 16 issues a notification that the ultrasound probe 1 is activated by the activation signal from the apparatus body 2, the user can easily understand the combination of the ultrasound probe 1 and the apparatus body 2 that are wirelessly connected to each other.

Meanwhile, for example, in facilities such as a hospital, a care facility, or a visiting nursing center, there may be a plurality of ultrasound probes 1 and a plurality of apparatus bodies 2 that can perform wireless communication with each other, and the plurality of ultrasound probes 1 and the plurality of apparatus bodies 2 may be shared among a plurality of users. In this case, the user may have difficulty in understanding the combination of the ultrasound probe 1 and the apparatus body 2 that are pairing-set with each other or are wirelessly connected to each other, among the plurality of ultrasound probes 1 and the plurality of apparatus bodies 2, which may hinder the smooth start of the examination.

The present invention is particularly useful in such a case, and even in a case where there are the plurality of ultrasound probes 1 or the plurality of apparatus bodies 2, the user can easily understand the combination of the ultrasound probe 1 and the apparatus body 2, which are wirelessly connected to each other, and can smoothly start the examination.

In addition, in a case where the notification unit 16 issues a notification of the distance between the ultrasound probe 1 and the apparatus body 2, the user can easily understand the position of the apparatus body 2 wirelessly connected to the ultrasound probe 1 and can use the apparatus body 2 for the examination of the subject.

Further, the notification unit 16 has a predetermined distance threshold value and can also issue a warning in a case where the distance between the ultrasound probe 1 and the apparatus body 2 measured by the distance measurement unit 15 exceeds the predetermined distance threshold value. The notification unit 16 can issue a warning, for example, by using the same method as the notification. In addition, the notification unit 16 can also issue a warning in a case where the ultrasound probe 1 cannot recognize the presence of the apparatus body 2. The user can search the apparatus body 2 while checking these warnings.

In a case where the ultrasound diagnostic apparatus comprises a plurality of apparatus bodies 2 that are pairing-set or pairing-settable with respect to the ultrasound probe 1, the selection unit 19 is used for the user to select one of the plurality of apparatus bodies 2. The selection unit 19 can be configured with, for example, a so-called toggle type switch or a plurality of so-called separate type switches. In addition, in a case where the ultrasound probe 1 has a monitor (not shown), the selection unit 19 can also be configured with a touch panel for selecting one of the plurality of apparatus bodies 2 displayed on the monitor.

In a case where the user performs the turn-on operation of the activation switch 18 in a state in which one of the plurality of apparatus bodies 2 is selected by the selection unit 19, the activation signal is transmitted from the ultrasound probe 1 to the apparatus body 2 selected by the selection unit 19, and the apparatus body 2 is switched from the sleep state to the activation state. In this case, the notification unit 25 of the apparatus body 2 issues a notification that the apparatus body 2 is activated by the ultrasound probe 1.

As a result, the ultrasound probe 1 and the apparatus body 2 that the user wants to use can be easily connected to each other in a wireless manner, and the combination of the ultrasound probe 1 and the apparatus body 2 which are wirelessly connected can be easily understood.

Although the processor 20 having the transmission and reception circuit 12, the image generation unit 13, the distance measurement unit 15, the notification unit 16, and the probe controller 17 is configured with a central processing unit (CPU) and a control program for causing the CPU to perform various types of processing, the processor 20 may be configured with a field programmable gate array (FPGA), a digital signal processor (DSP), an application specific integrated circuit (ASIC), a graphics processing unit (GPU), or other integrated circuits (ICs) or may be configured with a combination thereof.

In addition, the transmission and reception circuit 12, the image generation unit 13, the distance measurement unit 15, the notification unit 16, and the probe controller 17 of the processor 20 can also be configured by being partially or wholly integrated into one CPU or the like.

The body side wireless communication circuit 21 of the apparatus body 2 is configured with a circuit and the like including an antenna for transmitting and receiving radio waves, and performs wireless communication with the probe side wireless communication circuit 14 of the ultrasound probe 1. In this case, the body side wireless communication circuit 21 generates a transmission signal by modulating a carrier based on data to be wirelessly transmitted and transmits the generated transmission signal to the probe side wireless communication circuit 14. Further, the body side wireless communication circuit 21 demodulates the transmission signal transmitted from the probe side wireless communication circuit 14. As the modulation method of the carrier, for example, ASK, PSK, QPSK, 16QAM, or the like is used.

The body controller 26 controls each unit of the apparatus body 2 based on a program or the like stored in advance.

The input device 27 of the apparatus body 2 accepts an input operation from the user and sends out input information to the body controller 26. The input device 27 includes, for example, a device that is used for the user to perform an input operation, such as a keyboard, a mouse, a trackball, a touchpad, or a touch panel.

In a case where the ultrasound probe 1 and the apparatus body 2 are in a mutually pairing-set state or in a mutually pairing-settable state, and the ultrasound probe 1 is in a sleep state, the body controller 26 transmits the activation signal to the ultrasound probe 1 via the body side wireless communication circuit 21 in response to a predetermined input operation performed by the user via the input device 27. In a case where the ultrasound probe 1 receives the activation signal from the apparatus body 2, the ultrasound probe 1 is switched from the sleep state to the activation state, and the ultrasound probe 1 and the apparatus body 2 are wirelessly connected to each other.

Here, the ultrasound probe 1 and the apparatus body 2 being in the mutually pairing-settable state refers to a state in which at least the apparatus body 2, which transmits the activation command, recognizes the presence of the ultrasound probe 1, and the apparatus body 2 can request pairing-setting from the ultrasound probe 1. The apparatus body 2 can recognize the ultrasound probe 1, for example, in a case where the body controller 26 transmits a signal for requesting a response from the body side wireless communication circuit 21 toward the ultrasound probe 1 and the response is obtained from the ultrasound probe 1.

The distance measurement unit 24 measures the distance between the ultrasound probe 1 and the apparatus body 2 in the same manner as the distance measurement unit 15 of the ultrasound probe 1. In addition, the distance measurement unit 15 can also measure an azimuth with respect to the ultrasound probe 1 using the apparatus body 2 as a reference.

In the same manner as the notification unit 16 of the ultrasound probe 1, the notification unit 25 can issue a notification of the activation of the apparatus body 2 by the activation signal from the ultrasound probe 1 and the distance between the ultrasound probe 1 and the apparatus body 2 measured by the distance measurement unit 24. In addition, the notification unit 25 can also issue a notification of the azimuth with respect to the ultrasound probe 1 measured by the distance measurement unit 24 together with the distance between the ultrasound probe 1 and the apparatus body 2.

Further, the notification unit 25 has a predetermined distance threshold value similarly to the notification unit 16 of the ultrasound probe 1 and can also issue a warning in a case where the distance between the ultrasound probe 1 and the apparatus body 2 measured by the distance measurement unit 24 exceeds the predetermined distance threshold value. The notification unit 25 can also issue a warning in a case where the apparatus body 2 cannot recognize the presence of the ultrasound probe 1.

In a case where the ultrasound diagnostic apparatus comprises a plurality of ultrasound probes 1 that are pairing-set or pairing-settable with respect to the apparatus body 2, the selection unit 28 is used for the user to select one of the plurality of ultrasound probes 1 in the same manner as the selection unit 19 of the ultrasound probe 1. The selection unit 28 can be configured with a toggle type switch or a plurality of separate type switches. In addition, the selection unit 28 can also be configured with a touch panel for selecting one of the plurality of apparatus bodies 2 displayed on the monitor.

In a case where the user issues an instruction to activate the ultrasound probe 1 via the input device 27 in a state in which one of the plurality of ultrasound probes 1 is selected by the selection unit 28, the activation signal is transmitted from the apparatus body 2 to the ultrasound probe 1 selected by the selection unit 28, and the ultrasound probe 1 is switched from the sleep state to the activation state. In this case, the notification unit 16 of the ultrasound probe 1 issues a notification that the ultrasound probe 1 is activated by the apparatus body 2.

Under the control of the body controller 26, the display controller 22 of the apparatus body 2 performs predetermined processing on the ultrasound image or the like transmitted from the ultrasound probe 1 and displays the processed ultrasound image or the like on the monitor 23.

The monitor 23 performs various types of display under the control of the display controller 22. The monitor 23 can include, for example, a display device such as a liquid crystal display (LCD), or an organic electroluminescence (EL) display.

The processor 29 having the display controller 22, the distance measurement unit 24, the notification unit 25, and the body controller 26 is configured with a CPU and a control program for causing the CPU to perform various types of processing, but the processor 29 may be configured with FPGA, DSP, ASIC, GPU, or other ICs or may be configured with a combination thereof.

In addition, the display controller 22, the distance measurement unit 24, the notification unit 25, and the body controller 26 of the processor 29 can also be configured by being partially or wholly integrated into one CPU or the like.

Next, an example of the operation of the ultrasound diagnostic apparatus according to Embodiment 1 will be described using the flowchart of FIG. 4. Hereinafter, the apparatus body 2 will be described as a first device which is activated by the ultrasound probe 1, and the ultrasound probe 1 will be described as a second device which activates the apparatus body 2 in a sleep state. In addition, it is assumed that the ultrasound probe 1 and the apparatus body 2 are in a mutually pairing-set state or in a mutually pairing-settable state in advance before the start of step S1. Further, it is assumed that the apparatus body 2 is in a sleep state before the start of step S1.

First, in step S1, the probe controller 17 determines whether or not a predetermined operation for activating the apparatus body 2 is performed by the ultrasound probe 1. For example, the probe controller 17 determines that the predetermined operation is not performed in a case where the turn-on operation of the activation switch 18 is not particularly performed by the user, and performs processing of step S1 again. The probe controller 17 determines that the predetermined operation is performed in a case where the turn-on operation of the activation switch 18 is performed by the user. In this case, the processing proceeds to step S2.

In step S2, wireless communication for activating the apparatus body 2 is performed from the ultrasound probe 1 to the apparatus body 2. More specifically, the probe controller 17 generates an activation signal for activating the apparatus body 2 and wirelessly transmits the generated activation signal to the apparatus body 2 via the probe side wireless communication circuit 14.

In step S3, the apparatus body 2 switches itself from the sleep state to the activation state based on the wireless communication of step S2. More specifically, the body controller 26 switches the apparatus body 2 from the sleep state to the activation state based on the activation signal wirelessly transmitted from the ultrasound probe 1 in step S2. In this case, the ultrasound probe 1 and the apparatus body 2 are wirelessly connected to each other.

Finally, in step S4, the notification unit 25 of the apparatus body 2 issues a notification that the apparatus body 2 is activated by the ultrasound probe 1. As a result, for example, even in a case where there are a plurality of apparatus bodies 2 that is wirelessly connectable to the ultrasound probe 1, the user can easily understand the combination of the ultrasound probe 1 and the apparatus body 2, which are wirelessly connected to each other, and can smoothly start the examination of the subject.

Figure 4:
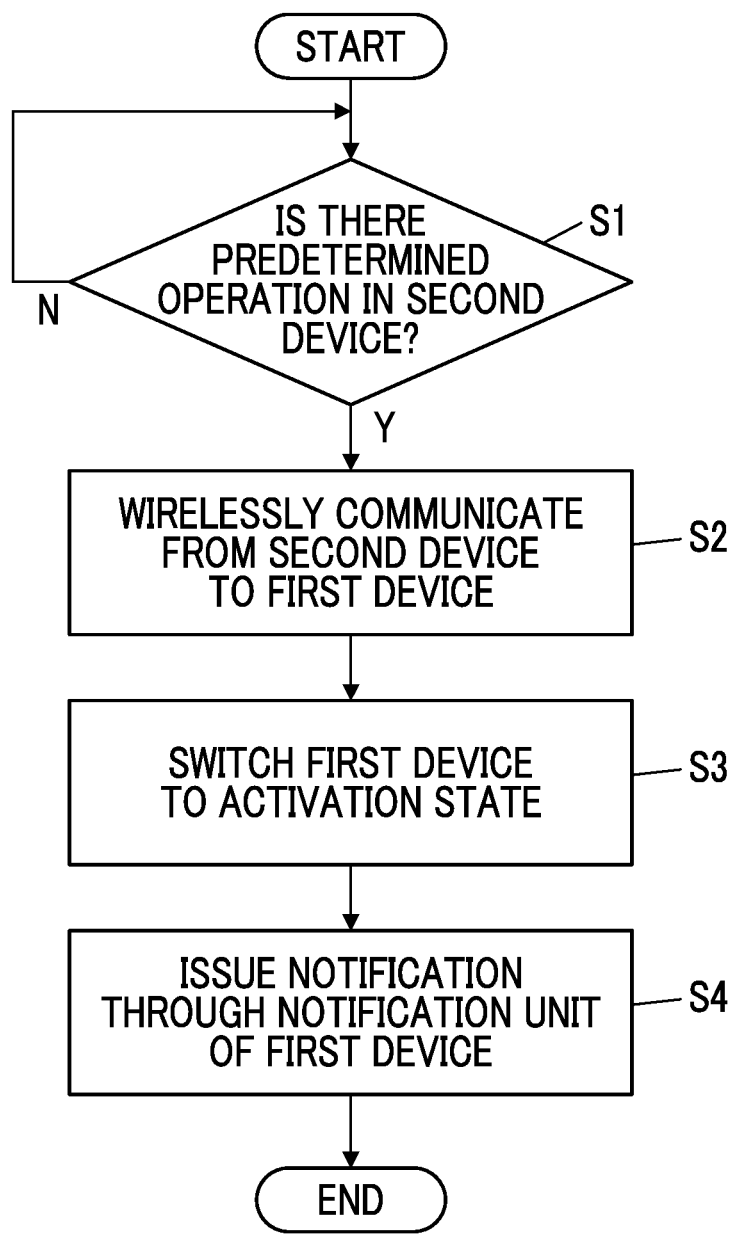
FIG. 4 is a flowchart showing an operation of the ultrasound diagnostic apparatus according to Embodiment 1 of the present invention.

In a case where the processing of step S4 is completed in this manner, the operation of the ultrasound diagnostic apparatus according to the flowchart of FIG. 4 is completed.

In the flowchart of FIG. 4, the apparatus body 2 is described as the first device in a sleep state, and the ultrasound probe 1 is described as the second device that activates the first device to the activation state, but the same processing is performed in a case where the ultrasound probe 1 is used as the first device and the apparatus body 2 is used as the second device. That is, the activation signal is wirelessly transmitted from the apparatus body 2 to the ultrasound probe 1 with a predetermined operation in the apparatus body 2, for example, an input operation performed by the user via the input device 27, as a trigger, the ultrasound probe 1 is switched from the sleep state to the activation state, and the notification unit 16 of the ultrasound probe 1 issues a notification that the ultrasound probe 1 is activated by the apparatus body 2.

As a result, for example, even in a case where there are a plurality of ultrasound probes 1 that are wirelessly connectable to the apparatus body 2, the user can easily understand the combination of the ultrasound probe 1 and the apparatus body 2, which are wirelessly connected to each other, and can smoothly start the examination of the subject.

As described above, with the ultrasound diagnostic apparatus of Embodiment 1, in a case where the first device at least consisting of one of the ultrasound probe 1 and the apparatus body 2 is in a sleep state, wireless communication is performed from the second device consisting of the other of the ultrasound probe 1 and the apparatus body 2 to the first device in response to a predetermined operation performed by the user with respect to the second device so that the first device is switched from the sleep state to the activation state, and the notification unit 16 or 25 of the first device issues a notification that the first device is activated by the second device. Therefore, even in a case where there are a plurality of ultrasound probes 1 or a plurality of apparatus bodies 2, the user can easily understand the combination of the ultrasound probe 1 and the apparatus body 2, which are wirelessly connected to each other, and can smoothly start the examination.

It has been described that the transmission and reception circuit 12 and the image generation unit 13 are provided in the ultrasound probe 1, but both the transmission and reception circuit 12 and the image generation unit 13, or the image generation unit 13 may be provided in the apparatus body 2.

Moreover, the apparatus body 2 may be a so-called stationary type, a portable type that is easy to carry, or a so-called handheld type that is configured with, for example, a smartphone or a tablet type computer. As described above, the type of the device that constitutes the apparatus body 2 is not particularly limited.

Further, although it has been described that the ultrasound probe 1 has the activation switch 18 for activating the apparatus body 2, the apparatus body 2 can also have the activation switch 18. In this case, the activation switch 18 of the apparatus body 2 is turned on by the user, whereby the activation signal is wirelessly transmitted from the apparatus body 2 to the ultrasound probe 1, and the operation state of the ultrasound probe 1 in the sleep state is switched to the activation state.

Further, the ultrasound probe 1 can also have a voice recognition unit (not shown) that recognizes a voice uttered by the user. In this case, the voice uttered by the user is used as the predetermined operation for activating the apparatus body 2. In a case where the user utters a voice, the voice recognition unit recognizes the voice. The probe controller 17 stores in advance a content of voice representing that the apparatus body 2 is activated, and the activation signal is generated in a case where the voice recognized by the voice recognition unit is, for example, a voice representing a predetermined specific content such as "activate the apparatus body". In a case where the probe controller 17 wirelessly transmits the activation signal to the apparatus body 2 via the probe side wireless communication circuit 14, the apparatus body 2 is switched from the sleep state to the activation state based on the activation signal.

In addition, in a case where the ultrasound probe 1 has the voice recognition unit, the selection unit 19 can select one of the plurality of apparatus bodies 2 based on voice recognition by the voice recognition unit. For example, the selection unit 19 stores a specific term for identifying each of the plurality of apparatus bodies 2 and can select one apparatus body 2 from among the plurality of apparatus bodies 2 based on the recognized term in a case where a voice representing any of the terms is recognized by the voice recognition unit.

The apparatus body 2 can also have the voice recognition unit. In this case, a voice uttered by the user is used as the predetermined operation for activating the ultrasound probe 1 in the same manner as in a case where the ultrasound probe 1 has the voice recognition unit. In addition, the selection unit 28 of the apparatus body 2 can also select one of the plurality of ultrasound probes 1 based on the voice recognition by the voice recognition unit, in the same manner as the selection unit 19 of the ultrasound probe 1.

Further, the ultrasound probe 1 can also have a vibration sensor (not shown) that detects a vibration of the ultrasound probe 1. In this case, a predetermined gesture operation for vibrating the ultrasound probe 1 is used as the predetermined operation for activating the apparatus body 2. For example, in a case where the user performs a gesture operation such as a gesture operation of vertically shaking the ultrasound probe 1, the vibration sensor detects a vibration pattern of the gesture operation performed by the user. The probe controller 17 stores in advance the vibration pattern of the gesture operation representing that the apparatus body 2 is activated, and the activation signal is generated in a case where the vibration pattern of the gesture operation detected by the vibration sensor corresponds to the vibration pattern stored in advance. In a case where the probe controller 17 wirelessly transmits the activation signal to the apparatus body 2 via the probe side wireless communication circuit 14, the apparatus body 2 is switched from the sleep state to the activation state based on the activation signal.

Further, in a case where the ultrasound probe 1 has the vibration sensor, the selection unit 19 can select one of the plurality of apparatus bodies 2 based on the gesture operation detected by the vibration sensor. For example, in a case where the selection unit 19 stores respective gesture operations for identifying the plurality of apparatus bodies 2, and any one of the gesture operations is detected, the selection unit 19 can select one apparatus body 2 from among the plurality of apparatus bodies 2 based on the detected gesture operation.

The apparatus body 2 can also have the vibration sensor. In this case, the gesture operation for vibrating the apparatus body 2 is used by the user as the predetermined operation for activating the ultrasound probe 1 in the same manner as in a case where the ultrasound probe 1 has the vibration sensor. In addition, the selection unit 28 of the apparatus body 2 can also select one of the plurality of ultrasound probes 1 based on the gesture operation detected by the vibration sensor in the same manner as the selection unit 19 of the ultrasound probe 1.

Further, in a case where the ultrasound probe 1 has a touch panel (not shown), a predetermined input operation performed via the touch panel can also be used as the predetermined operation for activating the apparatus body 2.

For example, in a case where the probe controller 17 displays the apparatus body 2, which is pairing-set or pairing-settable with the ultrasound probe 1, on the touch panel, and the user selects the apparatus body 2 displayed on the touch panel by a finger, a stylus pen, or the like as the predetermined input operation, the probe controller 17 can generate the activation signal. In a case where the probe controller 17 wirelessly transmits the activation signal to the apparatus body 2 via the probe side wireless communication circuit 14, the apparatus body 2 is switched from the sleep state to the activation state based on the activation signal.

In addition, for example, in a case where the user uses a finger or a stylus pen on the touch panel to draw shapes such as letters like "Z", numbers like "8", symbols like "+", or figures like a triangle as the predetermined input operation, the probe controller 17 recognizes the type of the shape drawn on the touch panel, such as letters, numbers, symbols, or figures. The probe controller 17 stores in advance a specific shape representing that the apparatus body 2 is activated and can generate the activation signal in a case where the recognized type of the shape coincides with a type of the specific shape. In a case where the probe controller 17 wirelessly transmits the activation signal to the apparatus body 2 via the probe side wireless communication circuit 14, the apparatus body 2 is switched from the sleep state to the activation state based on the activation signal.

In addition, in a case where the ultrasound probe 1 has the touch panel, the selection unit 19 can select one of the plurality of apparatus bodies 2 based on the type of the figure drawn on the touch panel, which is recognized by the probe controller 17. For example, in a case where the selection unit 19 stores types of respective figures for identifying the plurality of apparatus bodies 2, and any of the types of the figures is recognized, the selection unit 19 can select one apparatus body 2 from among the plurality of apparatus bodies 2 based on the recognized type of the figure.

The apparatus body 2 can also have a touch panel. In this case, the input operation of a predetermined figure performed via the touch panel is used as the predetermined operation for activating the ultrasound probe 1 in the same manner as in a case where the ultrasound probe 1 has the touch panel. In this case, the body controller 26 recognizes the type of the figure drawn on the touch panel. In addition, the selection unit 28 of the apparatus body 2 can also select one of the plurality of ultrasound probes 1 based on the type of the figure drawn on the touch panel, which is recognized by the body controller 26, in the same manner as the selection unit 19 of the ultrasound probe 1.

Further, in a case where there are a plurality of apparatus bodies 2 that are pairing-settable with respect to the ultrasound probe 1, the distance measurement unit 15 measures respective distances between the plurality of apparatus bodies 2 and the ultrasound probe 1, and the probe controller 17 can transmit the activation signal to the apparatus body 2 having a shortest distance to the ultrasound probe 1. In this case, the user can easily find the apparatus body 2 to be wirelessly connected to the ultrasound probe 1.

Further, in a case where there are a plurality of ultrasound probes 1 that are pairing-settable with respect to the apparatus body 2, the distance measurement unit 24 measures respective distances between the plurality of ultrasound probes 1 and the apparatus body 2, and the body controller 26 can transmit the activation signal to the ultrasound probe 1 having a shortest distance to the apparatus body 2.

Embodiment 2

For example, in a case where the ultrasound diagnostic apparatus is disposed in any of facilities such as a hospital, a care facility, or a visiting nursing center, the notification unit 16 or 25 can also issue a notification of the position of the ultrasound probe 1 or the apparatus body 2 in floor plan information of that facility, for example.

Figure 5:
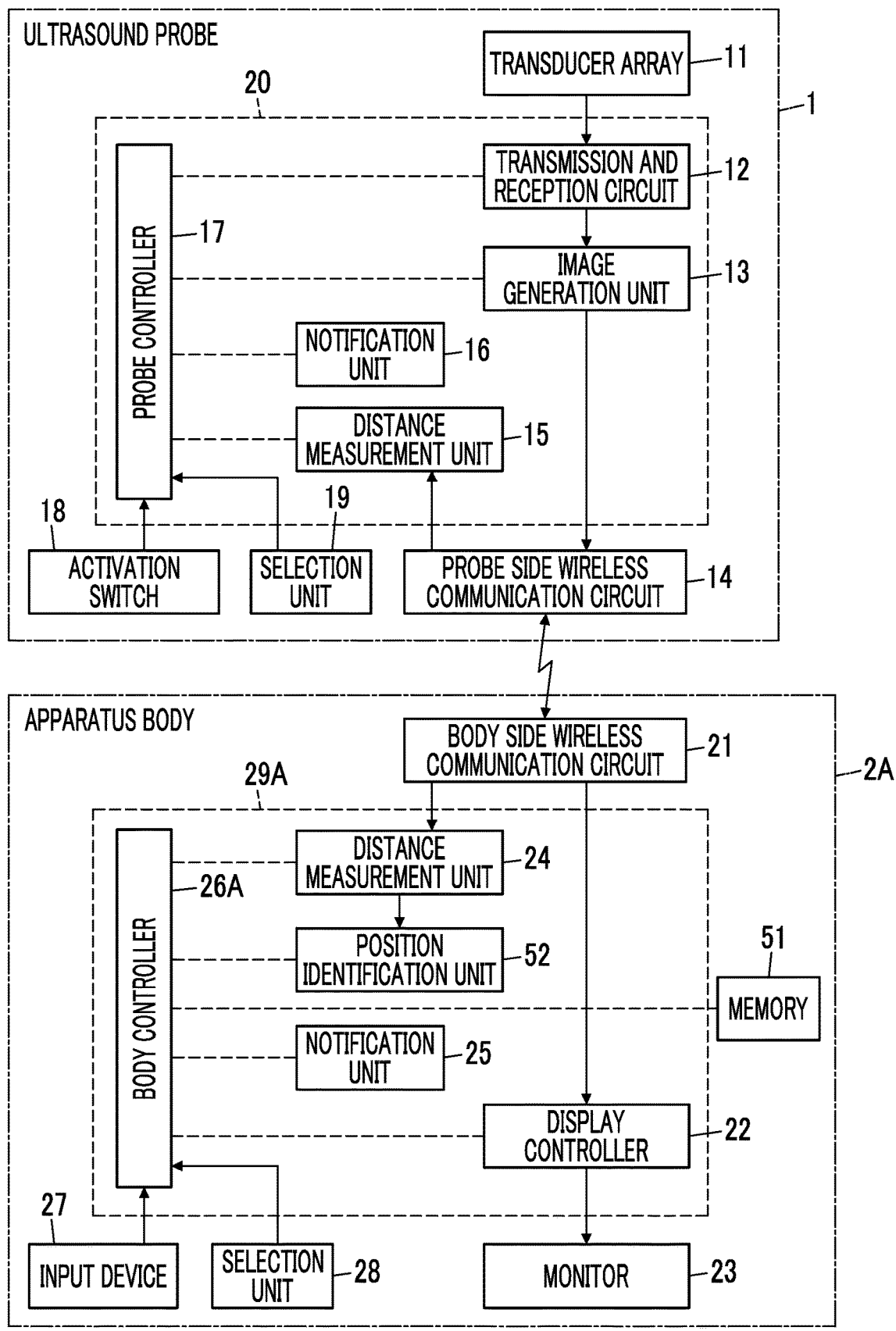
FIG. 5 is a block diagram showing a configuration of an ultrasound diagnostic apparatus according to Embodiment 2 of the present invention.

FIG. 5 shows a configuration of an ultrasound diagnostic apparatus of Embodiment 2. The ultrasound diagnostic apparatus of Embodiment 2 comprises an apparatus body 2A instead of the apparatus body 2 with respect to the ultrasound diagnostic apparatus of Embodiment 1 shown in FIG. 1. The apparatus body 2A further comprises a memory 51 and a position identification unit 52 and comprises a body controller 26A instead of the body controller 26, with respect to the apparatus body 2 in Embodiment 1.

In the apparatus body 2A, the memory 51 is connected to the body controller 26A. In addition, the position identification unit 52 is connected to the distance measurement unit 24. The position identification unit 52 is connected to the body controller 26A. Moreover, the display controller 22, the distance measurement unit 24, the notification unit 25, the body controller 26A, and the position identification unit 52 constitute a processor 29A for the apparatus body 2A.

Here, an example will be described in which the ultrasound probe 1 is a sleep state among the ultrasound probe 1 and the apparatus body 2A that are mutually pairing-set or mutually pairing-settable, and the user performs a predetermined operation with respect to the apparatus body 2A to switch the ultrasound probe 1 from the sleep state to the activation state.

The distance measurement unit 24 of the apparatus body 2A measures the distance between the ultrasound probe 1 and the apparatus body 2A and the azimuth with respect to the ultrasound probe 1 with the apparatus body 2A as a reference.

Figure 6:
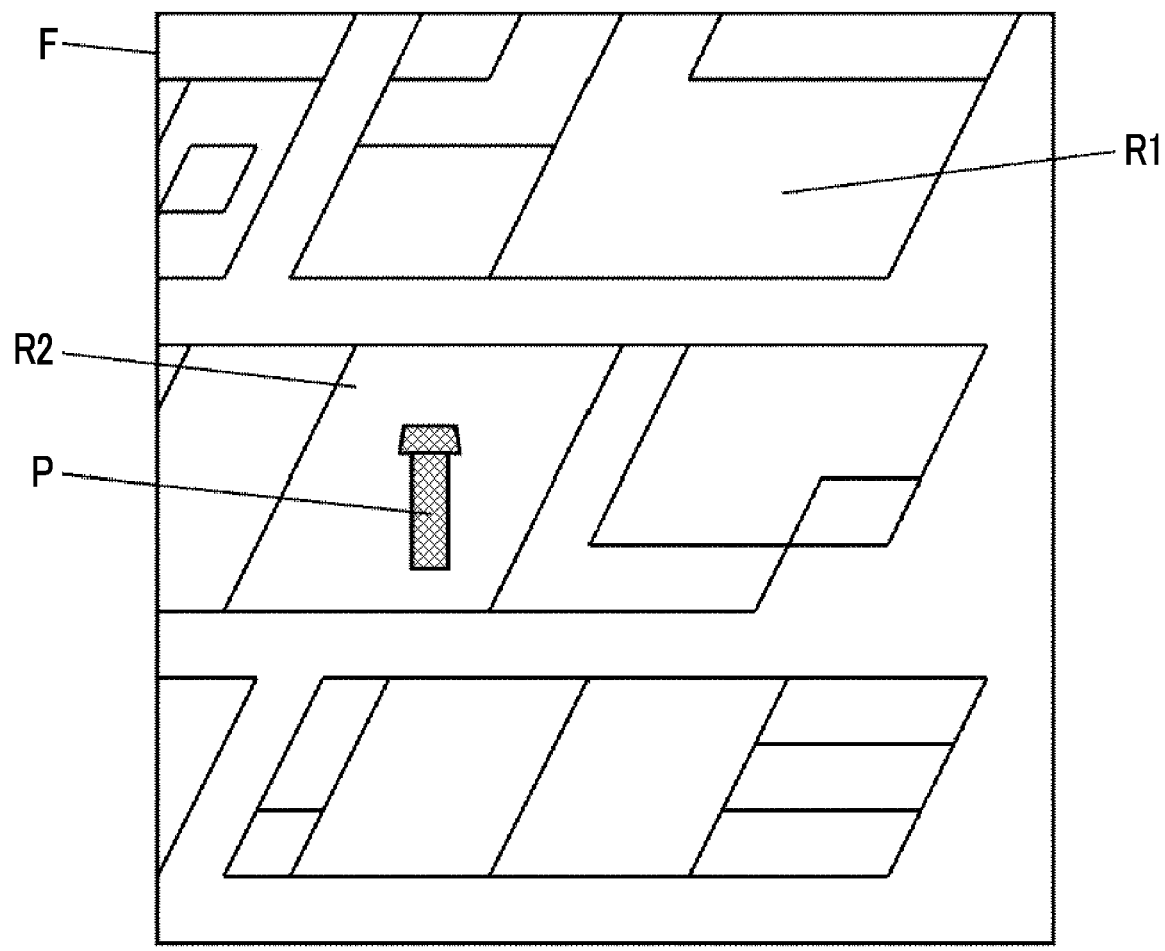
FIG. 6 is an example of a floor plan showing a position of an ultrasound probe.

For example, as shown in FIG. 6, the memory 51 stores floor plan information F of a facility equipped with the ultrasound probe 1 and the apparatus body 2A. The floor plan information F of FIG. 6 indicates, for example, a facility including a first examination room R1 and a second examination room R2.

The position identification unit 52 identifies the position of the ultrasound probe 1 in the floor plan information F based on position information of the apparatus body 2A, the distance between the ultrasound probe 1 and the apparatus body 2A measured by the distance measurement unit 24, the azimuth with respect to the ultrasound probe 1 with the apparatus body 2A as a reference, and the floor plan information F stored in the memory 51. In this case, the position identification unit 52 can acquire the position information of the apparatus body 2A by using, for example, information input by the user via the input device 27 or an existing technology such as Wi-Fi (registered trademark), GPS, BLE, or UWB.

The notification unit 25 can issue a notification of the position of the ultrasound probe 1 in the floor plan information F identified by the position identification unit 52 by, for example, displaying a mark P shown in FIG. 6 on the monitor 23. In the example of FIG. 6, since the mark P of the ultrasound probe 1 is located on the second examination room R2, the user can easily understand that the ultrasound probe 1 is located on the second examination room R2. As a result, the user can easily understand the position of the ultrasound probe 1 wirelessly connected to the apparatus body 2A, so that it is possible to eliminate the effort to search for the ultrasound probe 1 and to smoothly start the examination of the subject.

As described above, with the ultrasound diagnostic apparatus of Embodiment 2, the distance measurement unit 24 measures the azimuth with respect to the ultrasound probe 1 in accordance with the distance between the apparatus body 2A and the ultrasound probe 1, the position identification unit 52 identifies the position of the ultrasound probe 1 in the floor plan information F based on the memory 51 storing the floor plan information F of the facility equipped with the ultrasound probe 1 and the apparatus body 2A, and the distance and the azimuth measured by the distance measurement unit 24, and the notification unit 25 issues a notification of the position of the ultrasound probe 1 in the floor plan information F identified by the position identification unit 52. Therefore, the user can easily understand the position of the ultrasound probe 1 and smoothly start the examination of the subject.

Although it has been described that the notification unit 25 issues a notification of the position of the ultrasound probe 1 on the floor plan information F by displaying the mark P of the ultrasound probe 1 on the floor plan information F on the monitor 23, the method of issuing a notification of the position of the ultrasound probe 1 on the floor plan information F is not limited thereto. For example, in a case where the apparatus body 2A comprises a speaker (not shown), the notification unit 25 can issue a notification of the position of the ultrasound probe 1 on the floor plan information F through a voice using the speaker.

In addition, for example, in a case where the apparatus body 2A comprises a lamp (not shown), the notification unit 25 can issue a notification of the position of the ultrasound probe 1 on the floor plan information F by causing the lamp to blink in a blinking pattern corresponding to the position on the floor plan information F. Further, for example, in a case where the apparatus body 2A comprises a vibration device (not shown) that vibrates the apparatus body 2A, the notification unit 25 can issue a notification of the position of the ultrasound probe 1 on the floor plan information F by vibrating the vibration device in a vibration pattern corresponding to the position on the floor plan information F.

Moreover, in a case where the ultrasound diagnostic apparatus comprises a plurality of ultrasound probes 1 that are pairing-set or pairing-settable with the apparatus body 2A, the position identification unit 52 can identify a position of the ultrasound probe 1 in the floor plan information F that is not selected by the selection unit 28 among the plurality of ultrasound probes 1. In this case, the notification unit 25 can issue a notification of the position in the floor plan information F of the ultrasound probe 1 that is not selected by the selection unit 28, which is identified by the position identification unit 52. The user can easily understand the position of the ultrasound probe 1 to be used in the future, for example, in a case where the ultrasound probe 1 that is currently being used is replaced with the ultrasound probe 1 that is not selected by the selection unit 28 for use, which makes it possible to smoothly perform examination of the subject.

Figure 7:
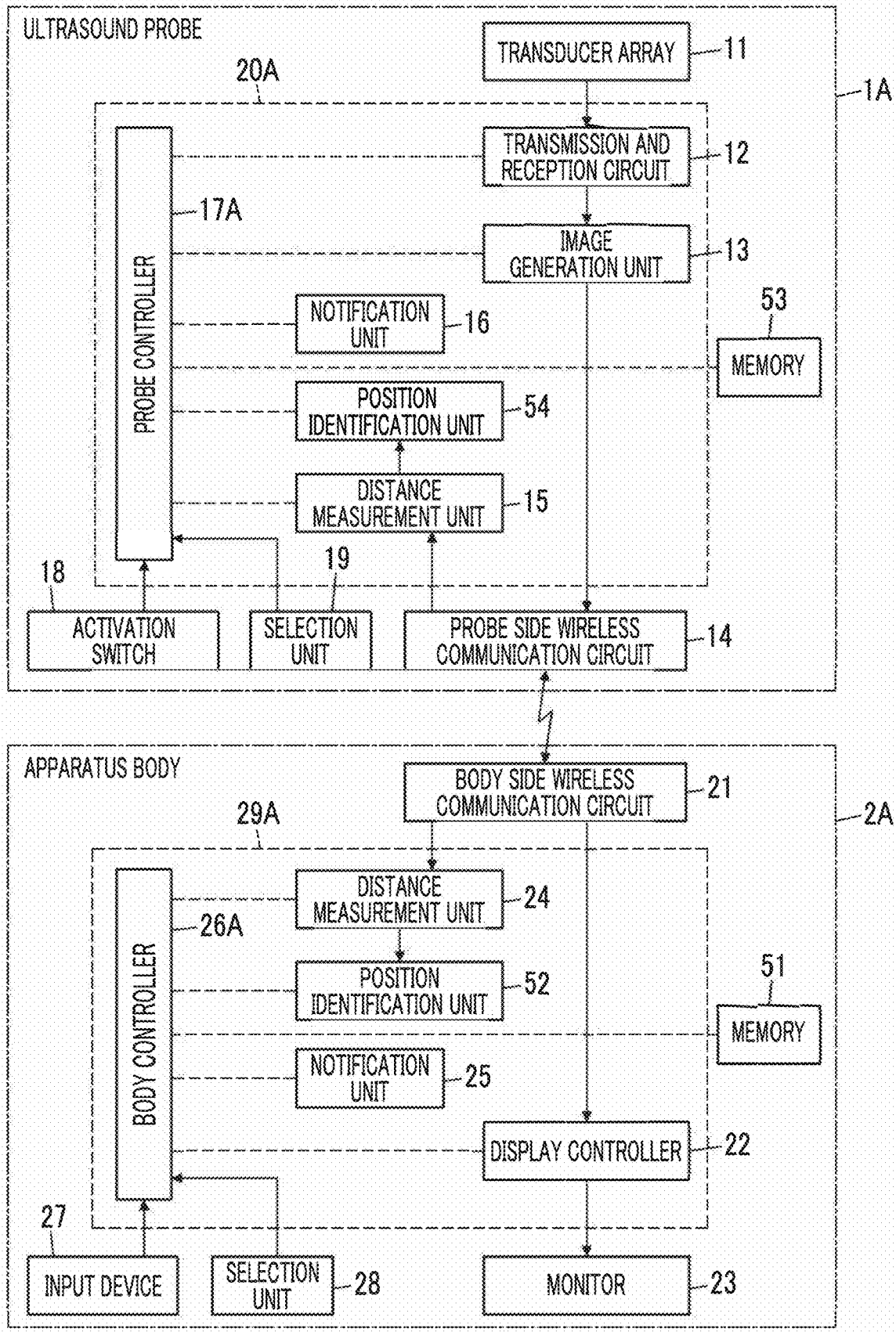
FIG. 7 is a block diagram showing a configuration of an ultrasound diagnostic apparatus according to a modification example of Embodiment 2 of the present invention.

Further, an example has been described in which the apparatus body 2A comprises the memory 51 and the position identification unit 52, but the ultrasound probe 1 can also comprise the memory 51 and the position identification unit 52 instead of the apparatus body 2A comprising the memory 51 and the position identification unit 52, and for example, as shown in FIG. 7, the apparatus body 2A can comprise the memory 51 and the position identification unit 52, and an ultrasound probe 1A can further comprise a memory 53 and a position identification unit 54.

In the modification example of FIG. 7, the ultrasound probe 1A further comprises the memory 53 and the position identification unit 54 and comprises a probe controller 17A instead of the probe controller 17, with respect to the ultrasound probe 1 in Embodiment 1 shown in FIG. 1. In the ultrasound probe 1A, the memory 53 is connected to the probe controller 17A. In addition, the position identification unit 54 is connected to the distance measurement unit 15. Further, the transmission and reception circuit 12, the image generation unit 13, the distance measurement unit 15, the notification unit 16, the probe controller 17A, and the position identification unit 54 constitute a processor 20A for the ultrasound probe 1A.

The memory 53 stores the floor plan information F of a facility equipped with the ultrasound probe 1A and the apparatus body 2A in the same manner as the memory 51 of the apparatus body 2A.

The distance measurement unit 15 measures the distance between the ultrasound probe 1A and the apparatus body 2A and the azimuth with respect to the apparatus body 2A with the ultrasound probe 1A as a reference.

The position identification unit 54 identifies, in the same manner as the position identification unit 52 of the apparatus body 2A, the position of the apparatus body 2A in the floor plan information F based on the position information of the ultrasound probe 1A, the distance between the ultrasound probe 1A and the apparatus body 2A and the azimuth with respect to the apparatus body 2A with the ultrasound probe 1A as a reference, which are measured by the distance measurement unit 15, and the floor plan information F stored in the memory 53.

The notification unit 16 can issue a notification of the position of the apparatus body 2A in the floor plan information F identified by the position identification unit 54. As a result, the user can easily understand the position of the apparatus body 2A wirelessly connected to the ultrasound probe 1A, so that it is possible to eliminate the effort to search for the apparatus body 2A and to smoothly start the examination of the subject.

EXPLANATION OF REFERENCES 1, 1A: ultrasound probe
2, 2A: apparatus body
11: transducer array
12: transmission and reception circuit
13: image generation unit
14: probe side wireless communication circuit
15, 24: distance measurement unit
16, 25: notification unit
17, 17A: probe controller
18: activation switch
19, 28: selection unit
20, 20A, 29, 29A: processor
21: body side wireless communication circuit
22: display controller
23: monitor
26, 26A: body controller
27: input device
31: pulsar
32: amplification section
33: AD conversion section
34: beam former
41: signal processing section
42: DSC
43: image processing section
51, 53: memory
52, 54: position identification unit
F: floor plan information
P: mark
R1: first examination room
R2: second examination room

What is claimed is:

1. An ultrasound diagnostic apparatus comprising:
an ultrasound probe; and
an apparatus body wirelessly connected to the ultrasound probe,
wherein the ultrasound probe is configured to perform wireless communication with the apparatus body,
the apparatus body is configured to perform wireless communication with the ultrasound probe,
each of the ultrasound probe and the apparatus body is configured to issue a notification to a user, and
a first device consisting of one of the ultrasound probe and the apparatus body is in a sleep state,
upon receiving an instruction to activate the first device by the user on a second device consisting of the other of the ultrasound probe and the apparatus body by the user, wireless communication is performed from the second device to the first device so that the first device is switched from the sleep state to an activation state, and a notification of that the first device is activated by the second device is issued by the first device, wherein the second device has a memory configured to store floor plan information of a facility equipped with the first device and the second device,
wherein the second device is configured to:
measure an azimuth with respect to the first device together with the distance to the first device,
identify a position of the first device in the floor plan information based on the distance and the azimuth with respect to the first device that is measured, and
issue a notification of the position of the first device in the floor plan information.

2. The ultrasound diagnostic apparatus according to claim 1,
wherein the first device and the second device are configured to be in a mutually pairing-set state or in a mutually pairing-settable state.

3. The ultrasound diagnostic apparatus according to claim 2, further comprising:
a plurality of the first devices configured to be pairing-set or pairing-settable with respect to the second device,
wherein the second device is configured to receive a selection of one of the plurality of first devices performed by the user, and
the first device selected by the user is switched from the sleep state to the activation state.

4. The ultrasound diagnostic apparatus according to claim 2,
wherein the second device is configured to
measure a distance to the first device, and
issue a notification of the distance to the first device that is measured.

5. The ultrasound diagnostic apparatus according to claim 1, further comprising:
a plurality of the first devices configured to be pairing-set or pairing-settable with respect to the second device,
wherein the second device is configured to receive a selection of one of the plurality of first devices performed by the user, and
the first device selected by the user is switched from the sleep state to the activation state.

6. The ultrasound diagnostic apparatus according to claim 5,
wherein the second device has a toggle type switch or a plurality of separate type switches, and
the second device is configured to receive the selection by the user via the toggle type switch or the plurality of separate type switches.

7. The ultrasound diagnostic apparatus according to claim 5,
wherein the second device is configured to
recognize a voice of the user, and
receive the selection by the user based on the voice of the user.

8. The ultrasound diagnostic apparatus according to claim 5,
wherein the second device has a monitor, and
the second device is configured to receive the selection of one of the plurality of first devices displayed on the monitor.

9. The ultrasound diagnostic apparatus according to claim 5,
wherein the second device has a vibration sensor, and
the second device is configured to receive the selection by the user based on shaking the second device by the user detected by the vibration sensor.

10. The ultrasound diagnostic apparatus according to claim 5,
wherein the second device has a touch panel, and
the second device is configured to receive the selection by the user based on an input operation of a predetermined figure performed via the touch panel.

11. The ultrasound diagnostic apparatus according to claim 1,
wherein the second device is configured to
measure a distance to the first device, and
issue a notification of the distance to the first device that is measured.

12. The ultrasound diagnostic apparatus according to claim 11,
wherein the second device is configured to issue a warning once the distance to the first device exceeds a predetermined distance threshold value.

13. The ultrasound diagnostic apparatus according to claim 7,
wherein the second device is configured to
perform a process to recognize the first device, and
issue a warning while the first device is unable to be recognized.

14. The ultrasound diagnostic apparatus according to claim 1, further comprising:
a plurality of the first devices configured to be pairing-set or pairing-settable with respect to the second device,
wherein the second device is configured to
receive a selection of one of the plurality of first devices performed by the user,
identify a position of the first device in the floor plan information, which is not selected by the user among the plurality of first devices, and
issue a notification of the position of the non-selected first device in the floor plan information.

15. The ultrasound diagnostic apparatus according to claim 1,
wherein the second device has an activation switch, and
the instruction is performed by turning on the activation switch.

16. The ultrasound diagnostic apparatus according to claim 1,
wherein the second device is configured to recognize a voice, and
the instruction is received by recognizing the voice.

17. The ultrasound diagnostic apparatus according to claim 1,
wherein the second device has a vibration sensor, and
the instruction is received by detecting, by the vibration sensor, that the user shakes the second device.

18. The ultrasound diagnostic apparatus according to claim 1,
wherein the second device has a touch panel, and
the instruction is performed via the touch panel.

19. A control method of an ultrasound diagnostic apparatus, comprising:
where a first device consisting of one of an ultrasound probe and an apparatus body is in a sleep state, and upon receiving an instruction to activate the first device by the user on a second device consisting of the other of the ultrasound probe and the apparatus body by a user,
switching the first device from the sleep state to an activation state by performing wireless communication from the second device to the first device;
issuing a notification that the first device is activated by the second device;
storing floor plan information of a facility equipped with the first device and the second device;

measuring an azimuth with respect to the first device together with the distance to the first device;

identifying a position of the first device in the floor plan information based on the distance and the azimuth with respect to the first device that is measured; and issuing a notification of the position of the first device in the floor plan information.

* * * * *